Nov. 27, 1962  A. M. WARN  3,065,727
SAFETY ALARM SIGNALS FOR VEHICLES
Filed Dec. 5, 1960
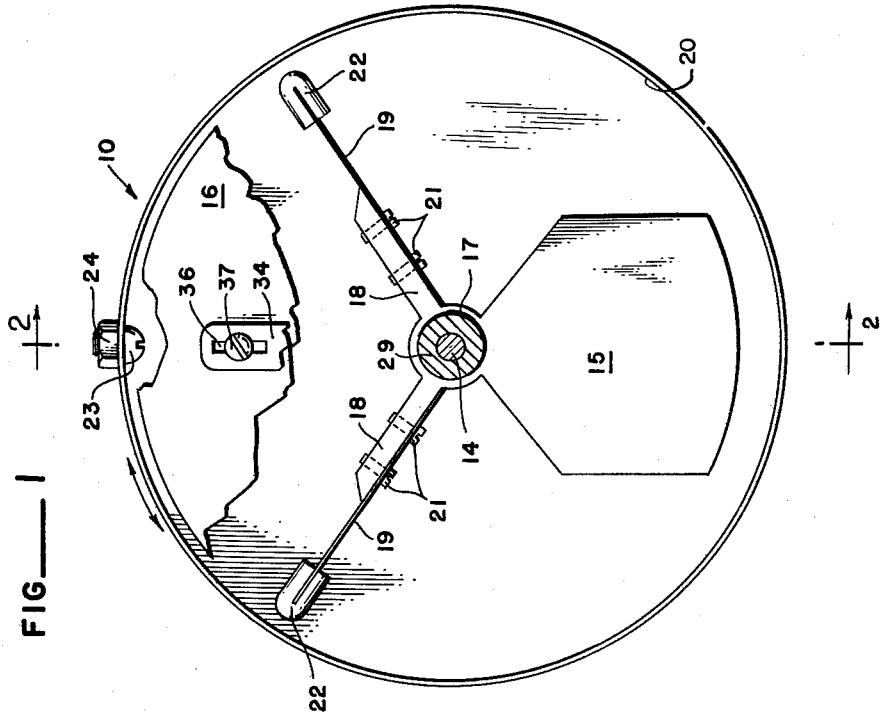
INVENTOR.
ARTHUR M. WARN
BY
ATTORNEY

3,065,727
SAFETY ALARM SIGNALS FOR VEHICLES
Arthur M. Warn, 18221 Pacific Highway S., Seattle 88, Wash.
Filed Dec. 5, 1960, Ser. No. 73,709
3 Claims. (Cl. 116—60)

This invention relates to new and useful safety signalling devices for vehicles.

The broad object of this invention is to provide a safety alarm signal for vehicles such as trucks, tractors, forklift trucks, and the like operated in areas in which there are people who may be injured. For example, loading and unloading docks and platforms, warehouses and stockrooms may require the use of such vehicles where people are likely to be moving about afoot. This device, attached to a vehicle wheel, will provide a warning to people nearby who may be engaged in other activity and whose attention may be diverted away from the dangers of a nearby moving vehicle. Similarly, this device is designed to warn individuals whom the driver may have failed to see.

More specifically this invention has as its object to provide vehicles with a safety alarm signal which produces a continuous audible alarm regardless of the direction of travel of the vehicle.

Another object is the provision of a signalling device of the character described which is entirely self-contained, requiring no outside electrical, mechanical, hydraulic or other power or motive connections, and which, despite the fact that it contains movable parts, requires only a single rigid attachment to the vehicle structure. Generally the motive power is provided by the relative movement between certain parts which revolve with a wheel of the vehicle and certain other parts which are restrained against rotation by a counter or pendulum-type or eccentric-type weight.

Another object of the invention is to provide a safety alarm signal for vehicles which is simple and economical in construction, efficient and dependable in operation, and readily adaptable to any type of vehicle moving on wheels.

With these objects in view, as well as other objects which will appear in the course of the specification, reference may be had to the following drawing wherein:

FIG. 1 is a rear elevational view of the device taken along line 1—1 of FIG. 2; and FIG. 2 is a side elevational view of the device, in section, taken along line 2—2 of FIG. 1 and wherein is shown a diagrammatic view of the hub portion of a vehicle wheel.

Referring to the drawing in detail it will be seen that the embodiment of the invention illustrated comprises a sounding bell 10 in the form of a shallow steel cylinder closed at one end and open at the other end. However, the bell may also be of other shapes. Furthermore, it is contemplated that the bell may be made of metals other than steel. The bell 10 comprises end wall 12 having a flange or cylindrical side wall 11 extending around its periphery. Bell 10 is adapted to be mounted on the shaft 14 of bolt 13. Within bell 10 and abutting end wall 12 is a bushing generally designated by reference numeral 26 and which is slidably received on shaft 14. Also within the bell 10 and pivotally mounted on bushing 26 is weight 15 having a hub portion 17 apertured to be received on bushing 26. Note that the generally cylindrically shaped bushing 26 is flanged as at 27, which flange serves to space weight 15 from end wall 12. The cylinder or sleeve portion 28 serves as the bearing for weight 15. Weight 15 is disposed eccentrically of shaft 14 and since it will normally hang downwardly through gravity, it prevents parts attached to it from rotating as the shaft turns. The weight may be of any form or contour so long as it contains enough mass below its hub to counter-balanced forces of friction, resistance of the spring arms 19 as the striker-heads 22 contact the instanding projection 23 more fully described hereinafter, and weight of the striker-heads and their supporting structures. Preferably it is formed of heavy metal plate.

Bushing 26 may be formed of metals such as brass or synthetic compositions, or plastics, all of which should be suitable bearing material. The sleeve portion 28 of the bushing, as can be seen is slightly longer than weight 15 is thick so that said weight has limited axial movement on sleeve 28 in order that it may retain its free pivotability.

Abutting the sleeve portion 28 is spacer sleeve 29 also slidably received on the shaft 14, the radial thickness of which is greater than the radial thickness of sleeve portion 28. Thus, spacer 29 forms a shoulder with sleeve 28 to limit the axial movement of weight 15. The other end of spacer sleeve 29 abuts against supporting plate 16 more fully discussed hereinafter.

When the elements discussed above are assembled as shown, nut 31 is then threaded on shaft 14, and bell 10, bushing 26, spacer 29, and supporting plate 16 are secured to each other to form a device capable of rotating as a single rigid unit.

Extending radially outwardly from hub 17 of weight 15 for approximately one half the distance from the axis of bell 10 to the inner surface of side wall 11 are rigid supporting arms 18. Flexible striker arms 19 are secured to the rigid supporting arms 18 by screws 21. Brass or other type metal clappers or striker beads 22 are slotted to be pressed and firmly attached to the outer ends of striker arms 19.

Preferably, the flexible striker arms are formed of leaf spring stock. Heads 22 are normally spaced a slight distance from the inner diameter of the side wall 11 to clear the bell as it revolves with the vehicle wheel. Obviously the number of striker heads may vary for, as will be apparent to a person skilled in the art, the weight could support one or a plurality of striker heads. The preferred embodiment shows two only for illustrative purposes.

Extending radially inwardly from the side wall 11 is boss 23 which may be a screw or any other type of projection. Boss 23 may be located anywhere on the bell so long as it is positioned to be struck by the clapper 22. If boss 23 is a screw, as shown, it is secured to the wall by nut 24. Boss 23 revolves with said bell in a plane coincident or nearly so with the plane in which the heads 22 lie. Boss 23 extends inwardly for a distance slightly greater than the distance by which heads 22 clear the inner surface of side wall 11. Thus it can be readily understood that heads 22 lie in the path of travel of boss 23. The number of times the bell is struck during a single revolution of this device is to be determined by the number of bosses provided on the bell and the number of striker heads carried by weight 15.

In FIG. 2 is shown supporting plate 16 which is firmly attached to bolt 13 by nut 31. In addition plate 16 substantially closes the open end of the bell and serves to protect the operation of moving parts within the bell from being impaired with grease, dirt and other deleterious matter. Shaft 14 is preferably integrally connected to plate 16.

In order to support the signal device on the wheel hub 44 of the particular vehicle it is necessary to fashion three or four brackets, identical to backets 32 shown in FIG. 2 for illustrative purposes and spaced at either 90° or 120° intervals from each other. Brackets 32 have horizontal legs 33 and at right angles thereto vertical legs 34. Legs 34 are provided with slots 36 for the purpose of permitting precise positioning of the signal alarm on the wheel hub 44. It should be observed that the axis of the bell 10 and shaft 14 should be, as nearly as possible, coaxial with the axis of hub 44.

Securing brackets 32 to the plate 16 are a plurality of means identical to bolts 37 and nuts 38. Assembled as described this invention forms a rigid unit ready for attachment to the vehicle wheel hub.

Legs 33 may be secured to hub 44 by strapping said legs thereto with steel strap 39 having an appropriate tightening or cinching mechanism (not shown). Alternatively the brackets may be designed so that third legs, such as legs 41 shown in dotted lines in FIG. 1 would fit the contours of the wheel to be attached thereto by the use of bolts or screws 42.

In operation it may readily be seen that when the vehicle moves in either direction plate 16, shaft 14 and bell 10 rotate with the vehicle wheel. As the bell makes a single revolution with the wheel, instanding projection 23 travels in a paths so as to strike the heads 22 to produce the audible alarm signal, it being remembered that weight 15 being freely pivoted on shaft 14 maintains the heads 22 in a relatively stationary position.

While I have shown and described a specific embodiment of my invention, it will be apparent to those skilled in the pertinent art that minor changes of structure, variations of material and other modifications can be made without departing from the spirit of the invention. It is contemplated that this invention may also be used on vehicles which run on tracks and on machinery such as gears and other wheels. In short this invention has application to most any type of body which rotates, the turning of which should be accompanied by a safety alarm signal.

What is claimed and desired to be protected by U.S. Letters Patent is:

1. A vehicular signal alarm for sounding a continuous audible warning of wheel rotation in either direction of wheel travel, comprising:
    (a) a shaft for coaxial rotation with a wheel;
    (b) A bell fixedly mounted on said shaft for rotation therewith;
    (c) a boss projecting from the inner surface of said bell;
    (d) a weight pivotally mounted on said shaft within said bell and depending therefrom in relatively stationary position by gravity; and
    (e) a bell striker flexibly mounted on said weight and disposed in the path of the boss on said bell to be struck by said boss for producing an alarm signal as said bell rotates.

2. A vehicular signal alarm for sounding a continuous audible warning of wheel rotation in either direction of wheel travel, comprising:
    (a) a shaft for coaxial rotation with a wheel;
    (b) a bell fixedly mounted on said shaft for rotation therewith;
    (c) a boss on the inner surface of said bell extending radially inwardly toward the axis of said bell;
    (d) a weight pivotally mounted on said shaft within said bell and positioned below said shaft by gravity; and
    (e) a pair of bell strikers flexibly mounted on said weight and disposed less than 180° apart in the path of said boss for producing repetitious alarm signals as said bell rotates.

3. A vehicular signal alarm for sounding a continuous audible warning of wheel rotation in either direction of wheel travel, comprising:
    (a) a shaft for coaxial rotation with a wheel;
    (b) a bell fixedly mounted on said shaft for rotation therewith;
    (c) a boss projecting from the inner surface of said bell;
    (d) a weight pivotally mounted on said shaft within said bell so that the mass of said weight is held in relatively stationary position below said shaft under force of gravity;
    (e) a pair of bell striker heads flexibly mounted on said weight at an acute angle to each other and disposed in the path of the boss on said bell for producing an alarm signal as said bell rotates.

References Cited in the file of this patent
UNITED STATES PATENTS

| | | |
|---|---|---|
| 631,926 | Branson | Aug. 29, 1899 |
| 716,471 | Pickop et al. | Dec. 23, 1902 |
| 1,240,889 | Shepp | Sept. 25, 1917 |
| 1,327,993 | Goldblatt | Jan. 13, 1920 |
| 2,802,441 | Epstein | Aug. 13, 1957 |